US012619441B2

(12) United States Patent
Kumar Rao et al.

(10) Patent No.: US 12,619,441 B2
(45) Date of Patent: May 5, 2026

(54) CONFIGURATION DATA COMPRESSION

(71) Applicant: QUALCOMM INCORPORATED, San Diego, CA (US)

(72) Inventors: Karthik Kumar Rao, San Diego, CA (US); Omesh Kumar Handa, San Marcos, CA (US); Suhrid Bhatt, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 343 days.

(21) Appl. No.: 18/448,018

(22) Filed: Aug. 10, 2023

(65) Prior Publication Data

US 2025/0053423 A1     Feb. 13, 2025

(51) Int. Cl.
*G06F 9/4401* (2018.01)

(52) U.S. Cl.
CPC .................................. *G06F 9/4403* (2013.01)

(58) Field of Classification Search
CPC .. G06F 9/4401; G06F 9/4411; G06F 9/44505; G06F 9/4403
See application file for complete search history.

(56) References Cited

U.S. PATENT DOCUMENTS

| | | | |
|---|---|---|---|
| 7,079,056 B2 * | 7/2006 | Weaver | H03M 7/46 |
| | | | 710/68 |
| 2008/0294863 A1 | 11/2008 | Faerber et al. | |
| 2023/0059746 A1 | 2/2023 | Chun et al. | |

OTHER PUBLICATIONS

Related PCT App. Ser. No. PCT/US24/033052, filed on Jun. 7, 2024, entitled, Configuration Data Compression, International Search Report and Written Opinion (EPO acting as ISA), issued Sep. 25, 2024—13 pages.

* cited by examiner

*Primary Examiner* — Brian T Misiura
(74) *Attorney, Agent, or Firm* — Smith Tempel Blaha LLC

(57) ABSTRACT

Compressed configuration data may be read from a non-volatile memory of a computing device, decompressed, and used to configure circuitry of the computing device. The decompressed configuration data may be in the form of key-value pairs. A lookup table of most frequently occurring values in the original or uncompressed configuration data may be used to determine the values.

15 Claims, 13 Drawing Sheets

102

IoT device                                           106

SoC 110     110A

Configurable circuitry 104                      112                     key   value Non-volatile memory compressed config data      Decompression circuitry                          110B 108                                          114     key   value Configurable circuitry

200

300

302

404

| starting key | number of keys |
|--------------|----------------|
| starting key | number of keys |
| ⋮ | ⋮ |
| starting key | number of keys |

402

| | |
|---|---|
| index = 0 ─▶ | value_X |
| index = 1 ─▶ | value_Y |
| | ⋮ |
| index = M-1 ─▶ | value_Z |

500

502    504

| Data item pattern | Operation indicated by data item |
|---|---|
| 0x00 | look up value in table using 0x00 as index |
| ⋮ | ⋮ |
| 0xEF | look up value in table using 0xEF as index |
| 0xF1 | unused |
| ⋮ | ⋮ |
| 0xFB | unused |
| 0xFC | use next 1 byte as the value |
| 0xFD | use next 2 bytes as next 2 values |
| 0xFE | use next 3 bytes as next 3 values |
| 0xFF | use next 4 bytes as next 4 values | opcodes { (0xFC, 0xFD, 0xFE, 0xFF)

FIG. 5

| Data item<br>1002 | Operation description<br>1004 | Result<br>1006 |
|---|---|---|
| 0x0E | section table lookup using section index=14 | section_base=0x000C390,<br>section_len =10 |
| 0x00 | constant table lookup using index=0 | [0x0000C390,0x00000000] |
| 0xFF | read next four data items: 0x27, 0x70, 0xA4, 0x16 | [0x0000C394,0x16A47027] |
| 0xFF | read next four data items: 0x50, 0x00, 0x50, 0x80 | [0x0000C398,0x80500050] |
| 0x95 | constant table lookup using index=149 | [0x0000C39C,0x01260016] |
| 0x94 | constant table lookup using index=148 | [0x0000C3A0,0x01001440] |
| 0x7C | constant table lookup using index=124 | [0x0000C3A4,0x00201440] |
| 0x6A | constant table lookup using index=106 | [0x0000C3A8,0x00010000] |
| 0x99 | constant table lookup using index=153 | [0x0000C3AC,0x04004444] |
| 0x55 | constant table lookup using index=85 | [0x0000C3B0,0x00002D00] |
| 0x00 | constant table lookup using index=0 | [0x0000C3B4,0x00000000] |

CONFIGURATION DATA COMPRESSION

DESCRIPTION OF THE RELATED ART

A computing device may include components such as processors, memory, input and output components, etc. Wireless computing devices may also include radio transceivers. The multiple components may be integrated on a "system-on-a-chip" ("SoC"). A computing device component may have programmable or otherwise configurable aspects that are configured into the hardware (circuitry) when the computing device boots, to prepare the computing device for operation in its normal operational mode (sometimes referred to as mission mode). During such a configuration process, the configuration data may be read from a non-volatile memory, such as flash memory.

Wireless computing device technology increasingly involves devices that are smaller in size and more focused in task range than desktop and laptop computers, tablet computers, smartphones, etc. Such "small" computing devices may include wearables such as wristwatch-style and eyewear-based devices, etc., automotive devices, industrial and agricultural sensors and controllers, electric or water utility meters, and small household devices such as smart thermostats, smart garage door openers, etc. Small computing devices that communicate wirelessly via the Internet may be referred to as Internet-of-Things ("IoT") devices. Such computing devices may be designed for low cost, and consequently may contain a relatively small amount of non-volatile memory available to store configuration data.

It may be desirable to store configuration data in an efficient manner due to the relatively small amount of non-volatile memory available for configuration data in the above-referenced types of computing devices. A data compression scheme that takes advantage of pre-known properties of the configuration data may be more efficient than general-purpose data compression schemes.

SUMMARY OF THE DISCLOSURE

Systems, methods, devices, and other examples of configuration data compression and decompression and configuring circuitry are disclosed.

An exemplary method for configuring circuitry in a computing device may include reading a sequence of data items stored in a non-volatile memory of the computing device. The method may further include providing a value corresponding to a data item using a table of most frequently occurring values. The method may still further include providing a next key corresponding to the value. The method may yet further include configuring the circuitry using the next key and the corresponding value.

An exemplary system for configuring circuitry in a computing device may include a non-volatile memory and decompressor circuitry. The decompressor circuitry may be configured to read a sequence of data items stored in the non-volatile memory. The decompressor circuitry may further be configured to provide a value corresponding to a data item using a table of most frequently occurring values. The decompressor circuitry may still further be configured to provide a next key corresponding to the value. The decompressor circuitry may yet further be configured to provide the next key and the corresponding value to configurable circuitry of the computing device.

Another exemplary system for configuring circuitry in a computing device may include means for reading a sequence of data items stored in a non-volatile memory of the computing device. The exemplary system may further include means for providing a value corresponding to a data item using a table of most frequently occurring values. The exemplary system may still further include means for providing a next key corresponding to the value. The exemplary system may yet further include means for configuring the circuitry using the next key and the corresponding value.

An exemplary system-on-a-chip ("SoC") may include at least one processor core, at least one configurable circuitry element, and decompressor circuitry. The decompressor circuitry may be configured to read a sequence of data items stored in the non-volatile memory. The decompressor circuitry may further be configured to provide a value corresponding to a data item using a table of most frequently occurring values. The decompressor circuitry may still further be configured to provide a next key corresponding to the value. The decompressor circuitry may yet further be configured to provide the next key and the corresponding value to configurable circuitry of the computing device.

BRIEF DESCRIPTION OF THE DRAWINGS

In the Figures, like reference numerals refer to like parts throughout the various views unless otherwise indicated. For reference numerals with letter character designations such as "101A" or "101B", the letter character designations may differentiate two like parts or elements present in the same Figure. Letter character designations for reference numerals may be omitted when it is intended that a reference numeral to encompass all parts having the same reference numeral in all Figures.

FIG. 5 is table illustrating data items and operations indicated by the data items, in accordance with exemplary embodiments.

FIG. 10 is a table illustrating an example of decompressing configuration data, in accordance with exemplary embodiments.

DETAILED DESCRIPTION

The word "exemplary" is used herein to mean "serving as an example, instance, or illustration." The word "illustrative" may be used herein synonymously with "exemplary." Any aspect described herein as "exemplary" is not necessarily to be construed as preferred or advantageous over other aspects.

Figure 1:
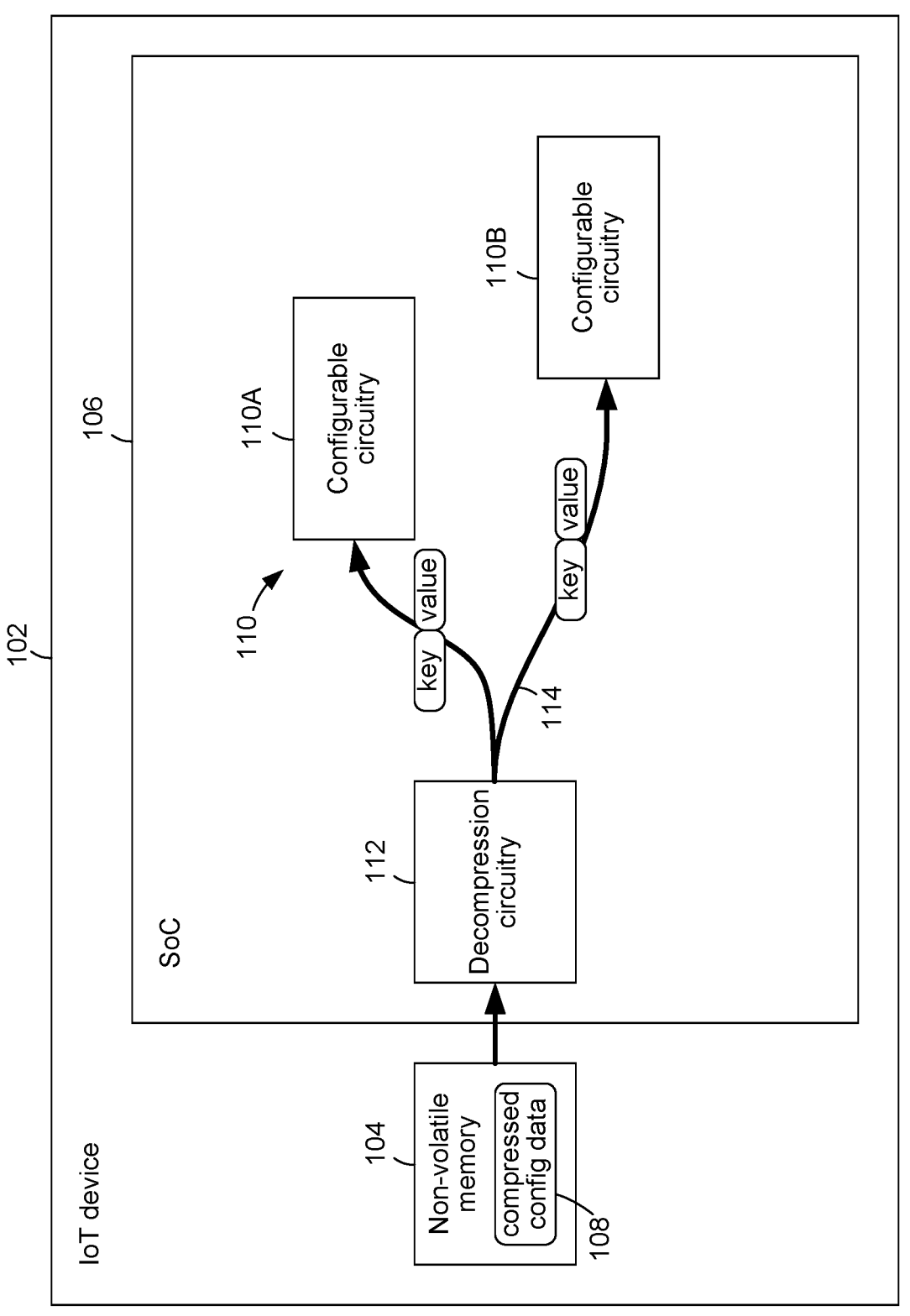
FIG. 1 is a block diagram of a system for configuring circuitry in a computing device, in accordance with exemplary embodiments.

As shown in FIG. 1, in an illustrative or exemplary embodiment a computing device 102 may include a non-volatile memory ("NVM") 104 and a system-on-a-chip ("SoC") 106. The non-volatile memory 104 may be, for example, flash memory. Compressed configuration data 108 may be stored in the non-volatile memory 104.

The computing device 102 may be, for example, an Internet-of-Things ("IoT") device. The computing device 102 may be, for example, a wearable device, such as a wristwatch-style or eyewear-based device, or it may be an automotive device, an industrial or agricultural device, a scientific instrument, a medical device, an electric or water utility meter, a small household device such as smart thermostat, smart garage door opener, etc.

The SoC 106 may include any number of configurable circuitry components 110, such as configurable circuitry components 110A, 110B, etc. Although in the exemplary computing device 102 the configurable circuitry components 110 are included in the SoC 106, in other examples (not shown) such configurable circuitry components may be packaged in separate chips, chiplets, etc. The configurable circuitry components 110 may include programmable circuitry, storage registers, memory locations, etc. The configurable circuitry components 110 may include processors or portions thereof that are configured through the execution of software or through input data, i.e., software settings. The term "software" as used herein includes firmware, etc., and may alternatively be referred to as "software/firmware."

The configuration data may have any format, and may include data used to configure circuitry in a static manner (e.g., bits in a register) or a dynamic manner (e.g., scripts). One example of configurable circuitry components 110 is calibration circuitry that is calibrated upon startup using configuration data 108 comprising calibration data. Another example of a configurable circuitry component 110 is a radio frequency ("RF") front-end module that may be included in RF transceiver circuitry. Configuring an RF front-end module may, for example, select frequency bands or other parameters.

The SoC 106 may include a decompressor (decompression circuitry) 112, configured to decompress the compressed configuration data 108 when the compressed configuration data 108 is read out of the non-volatile memory 104. Although not shown in FIG. 1, the decompressor 112 or other portion of the device 102 may include a working memory, such as a dynamic random access memory ("DRAM") or static random access memory ("SRAM"), into which the compressed configuration data 108 or portions thereof may be read and stored temporarily during the decompression methods described herein.

The decompressor 112 may output decompressed configuration data 114, which may then be provided to the configurable circuitry 110. The decompressed configuration data 114 may comprise pairs of "keys" and "values,"

described below. The compressed configuration data 108 may be read out of the non-volatile memory 104 and decompressed in a continuous or streaming manner or in a series of discrete blocks, etc., until the configurable circuitry 110 has been configured using the decompressed configuration data 114.

Figure 2:
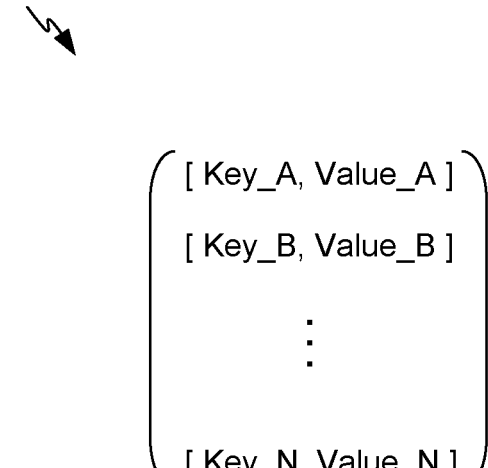
FIG. 2 is a data diagram illustrating a key-value format of configuration data, in accordance with exemplary embodiments.

With further reference to FIG. 2, configuration data 200 may comprise a list of key-value pairs: {[Key_A, Value_A], [Key_B, Value_B] . . . [Key_N, Value_N]}. That is, each of some number N of values corresponds to one of an equal number N of keys. The above-described decompressed configuration data 114 (FIG. 1) may be an example of the configuration data 200, because the decompression methods described below may transform compressed configuration data back to its original, uncompressed form. As described above with regard to FIG. 1, a value may be programmed into or otherwise used to configure the configurable circuitry 110. The key corresponding to that value may be used to control the manner in which the configurable circuitry 110 is configured using the value. For example, a key may be used in the manner of an address to identify the configurable circuitry 110 and enable the configurable circuitry 110 to receive the corresponding value. Nevertheless, key-value pairs may be used in other ways to configure configurable circuitry 110. The compression solutions described herein may take advantage of the key-value pair format of the configuration data 200, resulting in efficient compression, enabling the compressed configuration data to be stored in a smaller amount of memory space.

Figure 3:
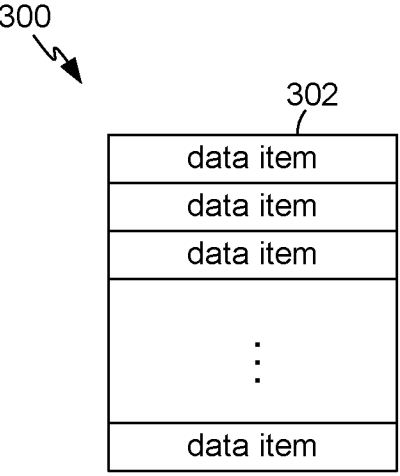
FIG. 3 is a list of sequential data items representing compressed configuration information, in accordance with exemplary embodiments.

As shown in FIG. 3, compressed configuration data 300 may comprise a sequence of data items 302. The compressed configuration data 300 may be an example of the compressed configuration data 108 described above with regard to FIG. 1.

Figure 4A:
FIG. 4A is a key table that may be used to provide sequences of keys, in accordance with exemplary embodiments.
Figure 4B:
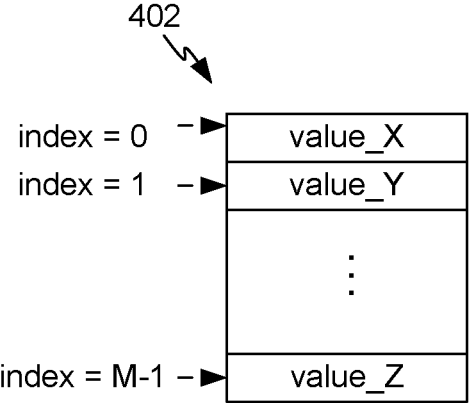
FIG. 4B is a value lookup table that may be used to provide values in response to indexes in the table, in accordance with exemplary embodiments.

As shown in FIG. 4B, values may be organized in a value lookup table 402. For example, the value lookup table 402 may contain a list of the most frequently occurring values in the (uncompressed) configuration data. Values may be looked up in response to an index, such as a number ranging from zero to a maximum "M−1" (where M is the number of entries in the value lookup table 402). In the illustrated value lookup table 402, the most frequently occurring value in the configuration data may be Value_X, which may be stored in a location in the value lookup table 402 identified or addressed by the index number 0. The next-most or second-most frequently occurring value in the configuration data may be Value_Y, which may be stored in a location in the value lookup table 402 identified or addressed by the index number 1. In this manner, the value lookup table 402 may contain or store values ranging from the most frequently occurring value (stored at index 0) to the Mth-most frequently occurring value (stored at index M−1). In the illustrated example, Value_Z may be stored at index M−1.

The value lookup table 402 may have any size. Nevertheless, in view of the benefits of the solutions described herein to small computing devices, such as IoT devices, the value lookup table 402 may be small in size. For example, the index may have a size of one byte, and the value lookup table 402 may therefore store up to 256 unique values (i.e., the 256 most frequently occurring values). Nevertheless, for reasons described below, the value lookup table 402 may be configured to store fewer than 256 values.

The keys may be generated in a sequence based on a predetermined pattern. The keys may comprise numbers. For example, a sequence of keys may be generated from a starting key (i.e., the first key) by incrementing the starting key and each key generated thereafter by a fixed increment.

In an example in which a starting key is 8 and the fixed increment is 4, the next key that is generated (i.e., the second key) may be 12, and the key that is generated after that (i.e., the third key) may be 16, etc. There may be multiple sequences of keys, where each sequence begins with a different starting key.

As shown in FIG. 4A, a key table 404 may be provided that lists starting keys and, for each starting key, the number of keys in the sequence. When all keys in a sequence (as indicated by the corresponding number of keys) have been generated based on one of the starting keys, keys in the next sequence may be generated, starting at the next starting key listed in the key table 404.

As shown in FIG. 5, a value lookup table 500 may comprise data item patterns or indices 502 and corresponding table entries 504. Each data item pattern 502 provides an index to look up a corresponding table entry 504. Each table entry 504 indicates an operation based on a corresponding data item pattern 502. In the example illustrated in FIG. 5, the value lookup table 500 may be configured to store 256 table entries 504. Accordingly, each index (number) 502 may be one byte. The 256 data item patterns or indices 502 are shown in FIG. 5 in hexadecimal notation (indicated by the prefix 0x), from a first index 0x00 through a 256th index 0xFF. In the exemplary value lookup table 500, the first 240 table entries 504 (i.e., in the range of indices 502 from 0x00 to 0XEF) are values, i.e., decompressed configuration data.

Data items may be read and processed in sequence. If the data item being processed matches a data item pattern or index 502 in the range of 0x00 to 0xEF, then the corresponding value (i.e., the output of the lookup operation using the table 500) may be read from the table entries 504 or from another value lookup table, e.g., the above-described value lookup table 402 (FIG. 4B). The portion of the table 500 relating to data items in the range of 0x00 to 0XEF may be similar to the above-described value lookup table 402. In the examples described herein, the operation to perform in response to a data item in the range of 0x00-0xEF is to look up a value in a table of most frequently occurring values using the data item as an index.

A difference between the value lookup table 402 (FIG. 4B) and the value lookup table 500 is that the last four data item patterns or indices 502, 0xFC-0xFF, are opcodes. Some examples of the solutions described herein may employ opcodes while other examples may not. In the exemplary value lookup table 500, the corresponding last four table entries 504 represent operations to perform when the data item being processed is an opcode. A data item being processed is an opcode if the data item matches one of the last four data item patterns or indices 502 in the value lookup table 500.

The operations indicated by opcodes comprise reading additional data and using the additional data as a value rather than looking up a value in a table using the data item as an index. The amount of additional data to read may be indicated by the opcode. For example, if the data item is the opcode 0xFC, the corresponding table entry 504 indicates that an additional one byte is to be read and used as the value (i.e., as the output of the lookup process based on the table 500). Similarly, if the data item is the opcode 0xFD, the corresponding table entry 504 indicates that an additional two bytes are to be read and used as the value. Likewise, if the data item is the opcode 0xFE, the corresponding table entry 504 indicates that an additional three bytes are to be read and used as the value. Lastly, if the data item is the opcode 0xFF, the corresponding table entry 504 indicates that an additional four bytes are to be read and used as the value. In other words, in the example illustrated in FIG. 5 the value lookup table 500 contains, and is used to look up, only the 240 most frequently occurring values; any values that are not contained in the value lookup table 500 may be provided by reading additional data. The manner in which such additional data may be read is described below. It should be understood that the illustrated value lookup table 500 is intended only as an example, and other value lookup tables may have other sizes, may be structured and used in other ways, etc.

Figure 6:
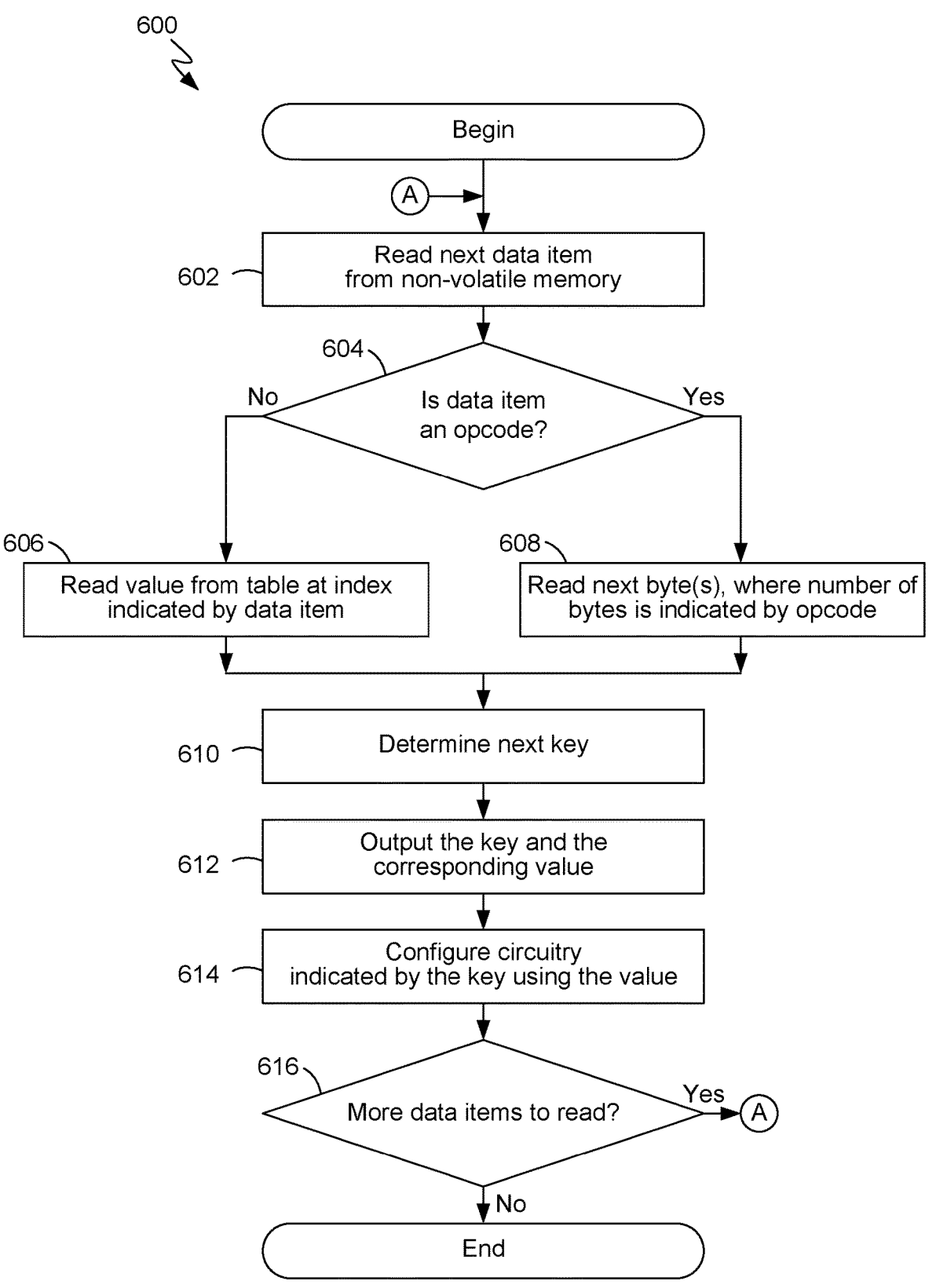
FIG. 6 is a flowchart illustrating a method for configuring circuitry in a computing device, in accordance with exemplary embodiments.

In FIG. 6, a method 600 for providing configuration data to configurable circuitry in a computing device is shown in flowchart form. As indicated by block 602, a data item may be read from a flash memory or other non-volatile memory. As there may be many such data items to process, the data item may be the next data item in a sequence of data items. The sequence of data items may represent compressed configuration data. As indicated by block 604, it may then be determined whether the data item is an opcode.

If the data item is not an opcode, then a corresponding value may be read from a value lookup table, as indicated by block 606. As described above with regard to FIGS. 4B and 5, such a value lookup table may comprise a list of most-frequently occurring values in the original or uncompressed data (key-value pairs). The data item may be used as an index to entries (i.e., values) in the value lookup table.

If the data item is an opcode, then an additional amount of data indicated by the opcode may be read, as indicated by block 608. The additional amount of data may be one or more bytes, where the number of bytes is indicated by the opcode. For example, as described above with regard to FIG. 5, four opcodes may be listed, respectively indicating to read one, two, three or four bytes. These bytes may be data items that follow the opcode.

As indicated by block 610, a key may be determined. As there may be many keys to provide, the key may be the next key in a sequence of keys. In some examples of the method 600, a key table may be used to determine a key in one of a number of sequences of keys, as described above with regard to FIG. 4A. The next key in a sequence may be determined by incrementing a previous key in the sequence by a fixed or predetermined number.

As indicated by block 612, the key and corresponding value (i.e., a key-value pair) may be output to the configurable circuitry. The key-value pair may represent decompressed configuration data. The key may identify or address the circuitry portion to be configured or may be used to indicate a manner in which to perform the configuring. As indicated by block 614, the configurable circuitry may be configured with the value in accordance with the key. As indicated by block 616, it may be determined whether all data items have been read from the non-volatile memory. If there are more data items to read, the method 600 may return to block 602. The actions described above with regard to blocks 602-614 may be repeated until, for example, all data items have been read from the non-volatile memory.

Although the operations (blocks) of the method 600 are described above in an exemplary order intended to enhance understanding of the principles and effects of the method 600, the operations may be performed in any order not inconsistent with such principles or effects. Further, alternative methods may include operations that are alternatives to the operations described above with regard to the method 600, and may include additional operations or fewer operations than described above.

Figure 7:
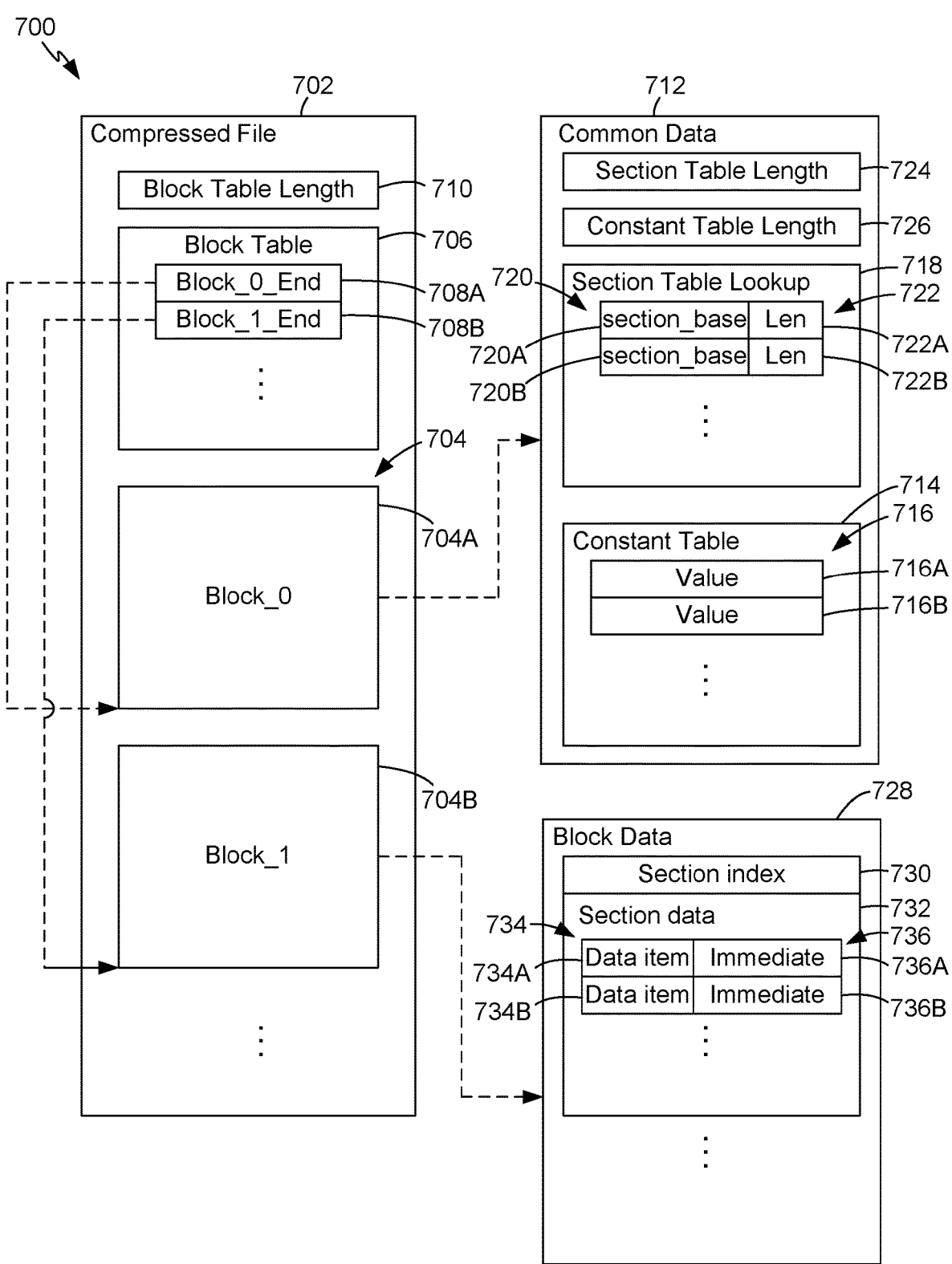
FIG. 7 is a data structure diagram illustrating files or other structures in which compressed configuration data may be organized or stored, in accordance with exemplary embodiments.

As shown in FIG. 7, data structures 700 may be used in compressing and decompressing configuration data. The data structures 700 may be in the form of files or portions of files. The illustrated data structures 700 may be referred to as tables, lookup tables, lists, etc., but it should be understood that they may have various forms or structures. It should be understood that data structures 700 are intended only as examples of how the information may be organized and used, and there may be other ways.

In the non-volatile memory (not shown), the compressed configuration data may be stored in the form of a compressed file 702. The compressed file 702 may store portions of the configuration data or related data in units that may be referred to as blocks 704, such as a first block ("Block_0") 704A, a second block ("Block_1") 704B, etc. There may be any number of blocks 704. The compressed file 702 may also include a block table 706. The block table 706 may contain table entries 708A, 708B, etc., indicating the end location (e.g., a memory address or offset) of the blocks 704A, 704B, etc., respectively. The compressed file 702 may further include a block table length 710, indicating the length of the block table 706.

One of the blocks 704, such as the first block 704A, may be used to store common data 712 that is common to all of the remaining blocks 704. The common data 712 may include a constants table 714, which may be similar in some aspects to the value lookup table 402 (FIG. 4B) or portion of the value lookup table 500 (FIG. 5). Entries in the constants table 714 may be the above-referenced most frequently occurring values 716, such as a first value 716A, a second value 716B, etc. Although not shown in FIG. 7, each entry or value in the constants table 714 may have a location identified by an index. For example, the first entry in the constants table 714 may have an index of 0, the second entry in the constant table may have an index of 1, etc.

The common data 712 may also contain a section lookup table 718. The section lookup table 718 may contain a list of base locations (section_base) 720, such as a first section_base 720A, a second section_base 720B, etc., and corresponding section lengths (section_len) 722, such as a first section_len 722A, a second section_len 722B, etc. Although not shown in FIG. 7, each entry (i.e., a section_base 720 and corresponding section_len 722) in the section table 718 may have a location identified by, or associated with, a section index (not shown in association with the section lookup table 718). For example, the first entry in the section lookup table 718 may have a section index of 0, the second entry may have a section index of 1, etc. The common data 712 may further contain a section table length 724 and a constant table length 726. As described below, the section lookup table 718 may be used in a manner similar to the above-described manner in which the key table 404 (FIG. 4A) may be used to determine sequences of keys.

Each block 704 other than the block 704A containing common data 712 may be organized in the manner indicated by the block data 728. The block data 728 may comprise any number of sections, each comprising a section index 730 and section data 732. The section data 732 may include a sequence of data items 734, such as a first data item 734A, a second data item 734B, etc. Immediately following each data item 734 in the section data 732 may be a group of zero or more bytes of an "immediate" value 736. In the illustrated example, a first group of zero or more bytes that may represent an immediate value 736A follows the first data item 734A, a second group of zero or more bytes that may represent an immediate value 736B follows the second data item 734B, etc. The term "immediate" or "immediate value" refers to a value obtained from the section data 732 when the data item being processed is an opcode rather than a value obtained from the constants table 714 when the data item is not an opcode. When the data item is not an opcode, there may be zero bytes representing an immediate value 736. Although for purposes of clarity in FIG. 7 an immediate value 736 is conceptually shown following or associated with each data item 734, when the data item 734 is not an opcode the immediate value 736 consists of zero bytes and does not occupy storage space.

Figure 8A:
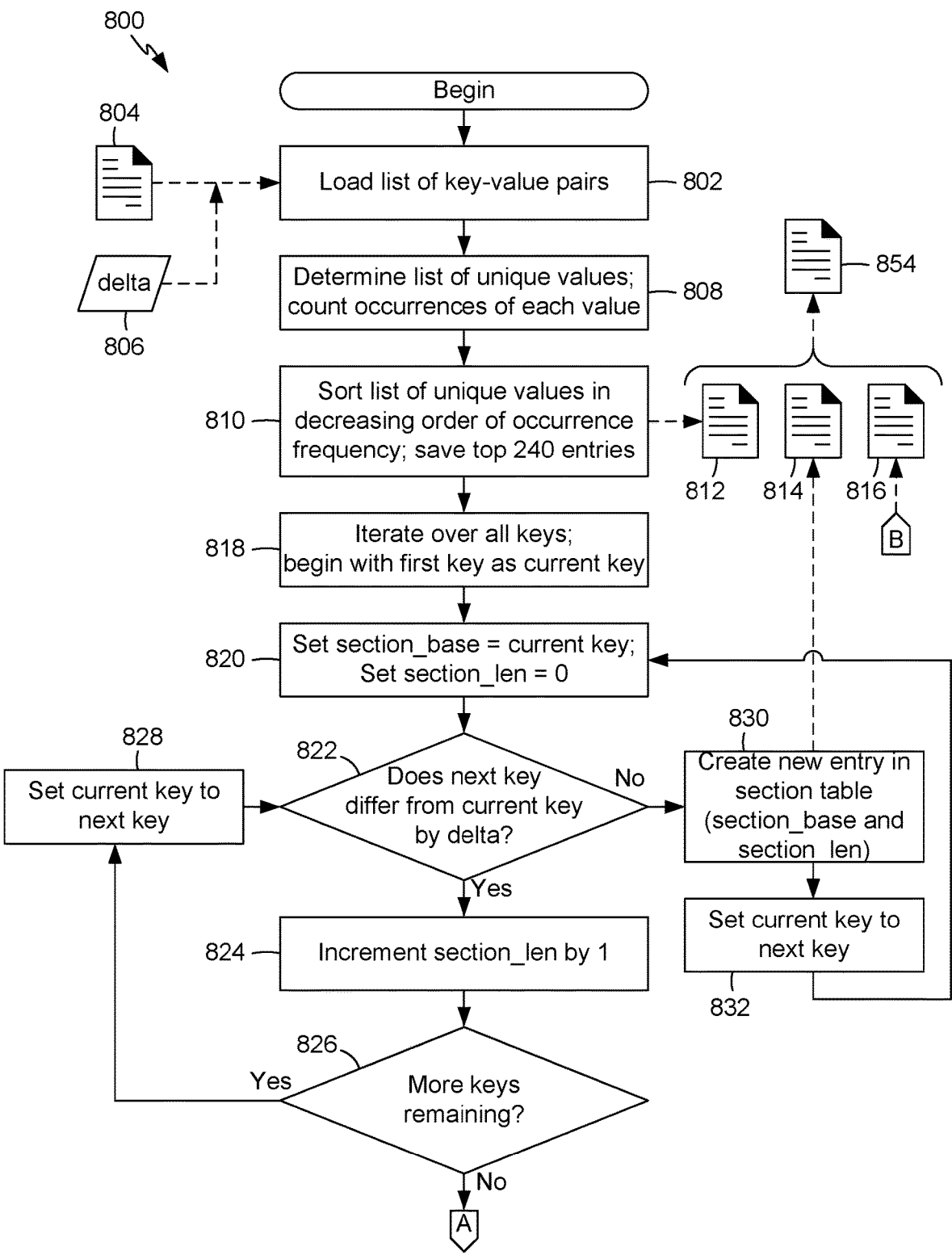
FIG. 8A is a flowchart illustrating a method for compressing configuration data, in accordance with exemplary embodiments.
Figure 8B:
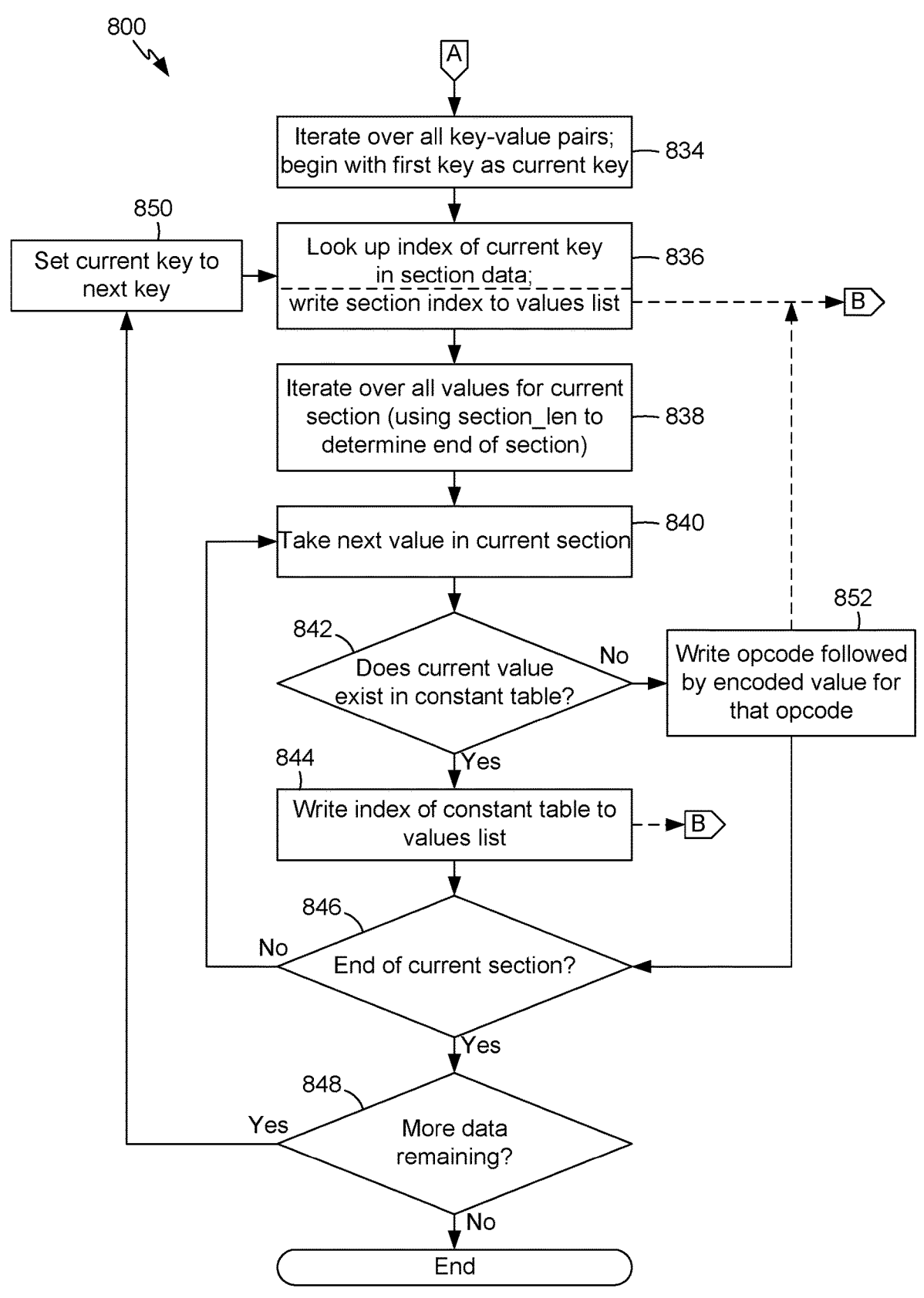
FIG. 8B is a continuation of the flowchart of FIG. 8A.

In FIGS. 8A-8B, a method 800 for compressing configuration data is shown in flowchart form. The method 800 may be used to generate the above-described compressed file 702 (FIG. 7). The method 800 may be performed in, for example, a computing device other than the computing device in which the compressed data is later decompressed and used to configure circuitry. That is, the method 800 may be performed in another computing device at a time prior to use of the computing device having the configurable circuitry. For example, the method 800 may be performed in conjunction with the manufacture or commercial distribution of the computing device having the configurable circuitry.

As indicated by block 802 (FIG. 8A), a list of key-value pairs 804, such as described above with regard to FIG. 2, may be provided as input to the method 800. The list of key-value pairs 804 may be in the form of an input file. A number that may be referred to herein as "delta" 806 may also be provided as an input. Delta indicates an increment or step (e.g., in units such as bytes) between successive keys in the list 804. Successive keys in the list of key-value pairs 804 may differ by uniform steps of delta in some regions of the list 804, but there may be other regions in the list 804 in which the next key differs from the previous key by a number other than delta. The section_base 720 and section_len 722 in the above-described section lookup table 718 (FIG. 7) may be used to indicate where one such key sequence ends and a next key sequence begins.

As indicated by block 808, a list of all unique values in the list of key-value pairs 804 may be determined. That is, each pair or item in the list of key-value pairs 804 may be examined in turn, and a value may be added to the list of unique values if the value has not yet been added. Also, when each successive item in the list of key-value pairs 804 is examined, a count of the number of occurrences of the value may be incremented by one.

As indicated by block 810, the list of unique values may be sorted in order of frequency of occurrence using the aforementioned count. For example, the list of unique values may be sorted in decreasing order of frequency of occurrence, thereby placing the most frequently occurring value at the beginning of the list, placing the least frequently occurring value at the end of the list, etc.

In the exemplary method 800, some of the least frequently occurring unique values may be discarded (i.e., not placed or retained in the list), and only the more frequently occurring values may be placed or retained in the list. It may be beneficial for the list to contain fewer than 256 unique values so that each value can be indexed by only one byte. For example, the list may be tailored to retain only the 240 most frequently occurring values. Nevertheless, in other examples of such a method the list may contain any number of values and be indexed by a number greater than or less than one byte.

The result of the above-described sorting (and, in some examples discarding less frequently occurring values) may be referred to as a constants list 812. The constants list 812 may be in the form of a file. In addition to the constants list 812, a sections list 814 and a values list 816 may be provided, as described below, which may similarly be in the form of files. The above-described (FIG. 7) constants table 714, section lookup table 718, and block data 728, may indicate examples of the structure or organization of the constants list 812, the sections list 814, and the values list 816, respectively.

As indicated by block 818, the method 800 then may iterate over all of the keys in the list of key-value pairs 804. That is, the keys in the list of key-value pairs 804 may be processed in the sequence or order they are listed. The key being processed may be referred to as the current key, and the key following that key in the sequence or list of key-value pairs 804 may be referred to as the next key. As indicated by block 820, a section_base (i.e., a number indicating the location of the beginning of a section in the file) may be set to the current key, and a section_len (i.e., a number indicating the length of the section) may be set to zero.

As indicated by block 822, it may then be determined whether the next key differs from the current key by delta. As noted above, there may be any number of successive keys in the list of key-value pairs 804 in which the next key differs from the current key by delta, but there may also be some instances in which the next key differs from the current key by an amount other than delta. A group or sequence of successive keys in the list of key-value pairs 804 in which the next key differs from the current key by delta may be associated with a section.

If it is determined (block 822) that the next key differs from the current key by delta, then section_len may be incremented by one, as indicated by block 824. As indicated by block 826, it may then be determined whether more keys remain to be processed in the list of key-value pairs 804, i.e., whether no "next key" exists. If it is determined that more keys remain to be processed, then the next key may become the current key, a new next key may be taken from the list of key-value pairs 804, as indicated by block 828, and processing may return to block 822.

If it is determined (block 822) that the next key differs from the current key by some number other than delta, then a new entry may be created in the section table 814, as indicated by block 830. Creating the new entry in the section table 814 may include setting the section_base to the next key, and setting the section_len to zero. Then, the next key may become the current key, a new current key may be taken from the list of key-value pairs 804, as indicated by block 832, and processing may return to block 820.

If it is determined (block 826) that no more keys remain to be processed, then the method 800 continues on FIG. 8B at block 834. As indicated by block 834, the method 800 may then iterate over all of the key-value pairs 804. That is, the keys in the list of key-value pairs 804 are again processed in the sequence or order they are listed.

As indicated by block 836, the current key may be used to look up or determine the section index in the section lookup table 718 (FIG. 7). Referring briefly again to FIG. 7, the current key is associated with a current section or entry in the section lookup table 718, comprising a section_base 720 and a corresponding section_len 722. The first key that is processed is associated with the first entry in the section lookup table 718, which may have a section index of 0. The section_len 722 of the current entry indicates the number of keys in the key sequence associated with that section. After that number of keys are processed (as described below), the next key will be associated with the next section or entry in the section lookup table 718. Each entry in the section lookup table 718 may be identified or located by its index (not shown in FIG. 7). This section index may be determined based on the current key in accordance with the foregoing relationship. This section index may then be stored in (i.e., written to) the values list 816 (FIG. 8A). As noted above, the block data 728 (FIG. 7) is an example of the structure or organization of the values list 816, and accordingly, this number that is determined in block 836 may be stored as the section index 730 (FIG. 7).

As indicated by block 838, the method 800 may then iterate over all of the values in the list of key-value pairs 804 in the current section. That is, the values in the list of key-value pairs 804 are processed in the sequence or order they are listed, up to a number of values indicated by the section_len of the current section. The value being processed may be referred to as the current value, and the value following that value in the sequence or list of key-value pairs 804 may be referred to as the next value.

As indicated by block 840, processing of the next value in the current section may begin. The value being processed may be referred to as the current value.

As indicated by block 842, it may be determined whether the current value exists in the constants table 714 (FIG. 7). If it is determined that the current value exists in the constants table 714, then the index of that value in the constants table 714 may be stored in (i.e., written to) the values list 816 (FIG. 8A), as indicated by block 844. As noted above, the block data 728 (FIG. 7) is an example of the structure or organization of the values list 816, and accordingly, this number that is determined in block 836 may be stored as the data item 734 (FIG. 7). The data item 734 in such an instance is not followed by any bytes representing an immediate value 736 (i.e., is followed by zero bytes representing an immediate value 736).

As indicated by block 846, it may then be determined whether the processing has reached the end of the current section. That is, it may be determined whether a number of values equal to the section_len have been processed. If it is determined (block 846) that the processing has not reached the end of the current section, then processing may return to block 840, and the next value in the current section may be processed.

If it is determined (block 846) that the processing has reached the end of the current section, then it may be determined whether more key-value pairs in the list of key-value pairs 804 remain to be processed, as indicated by block 848. If it is determined that more key-value pairs remain to be processed, then the next key may become the current key, as indicated by block 850, a new next key may be taken from the list of key-value pairs 804, and processing may return to block 836.

If it is determined (block 842) that the current value does not exist in the constants table 714, then an opcode indicating some number of bytes may be stored in (i.e., written to) the values list 816 (FIG. 8A), as indicated by block 852. As noted above, the block data 728 (FIG. 7) is an example of the structure or organization of the values list 816. In accordance with that exemplary structure and the exemplary opcodes described above: a data item 734 consisting of the opcode 0xFC may be stored if the current value does not exist in the constants table 714 and may be represented by only one byte; a data item 734 consisting of the opcode 0xFD may be stored if the current value does not exist in the constants table 714 and may be represented by only two bytes; a data item 734 consisting of the opcode 0xFE may be stored if the current value does not exist in the constants table 714 and may be represented by only three bytes; and a data item 734 consisting of the opcode 0xFF may be stored if the current value does not exist in the constants table 714 and may be represented by four bytes. In this example, four bytes is the maximum needed to represent any value. The number of bytes (i.e., units of eight bits) required to represent a value depends on whether higher-order bits of the value would be zero. For example, data values between (in decimal notation) 0 and 15 may be represented by a single byte, as any higher-order bits would be zero. These bytes may be stored as an immediate value 736 following the opcode (data item 734).

In the manner described above, the method 800 may produce the constants list 812, the sections list 814, and the values list 816 (FIG. 8A), which may be in the form of three respective files. Although not indicated by a block in the method 800, the constants list 812, the sections list 814, and the values list 816 may be combined into a single compressed file 854. The compressed file 702 (FIG. 7) may be an example of the compressed file 854.

Although the operations (blocks) of the method 800 are described above in an exemplary order intended to enhance understanding of the principles of the method 800, the operations may be performed in any order not inconsistent with such principles or effects. Further, alternative methods may include operations that are alternatives to the operations described above with regard to the method 800, and may include additional operations or fewer operations than described above.

Figure 9A:
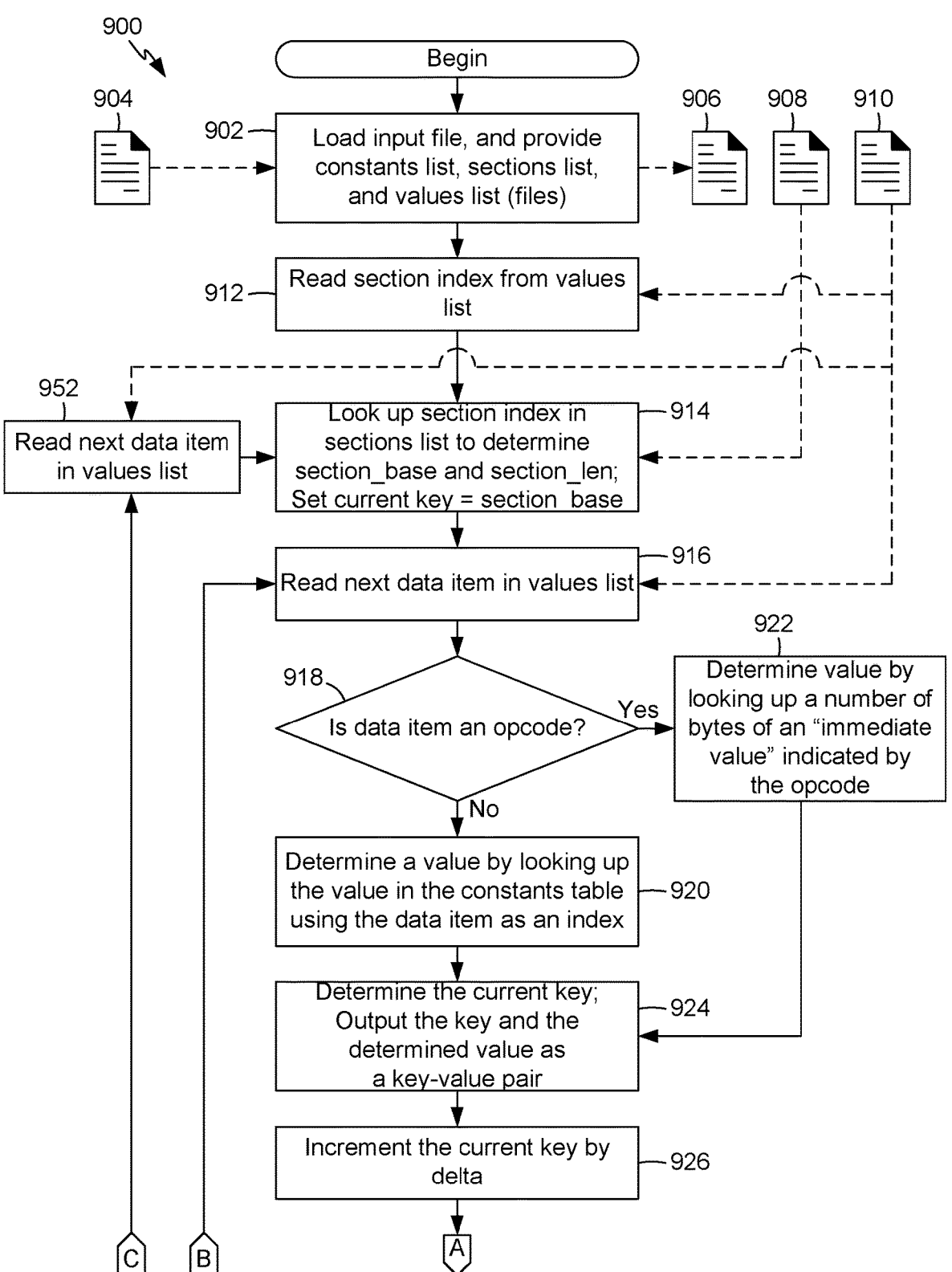
FIG. 9A is a flowchart illustrating a method for decompressing configuration data, in accordance with exemplary embodiments.
Figure 9B:
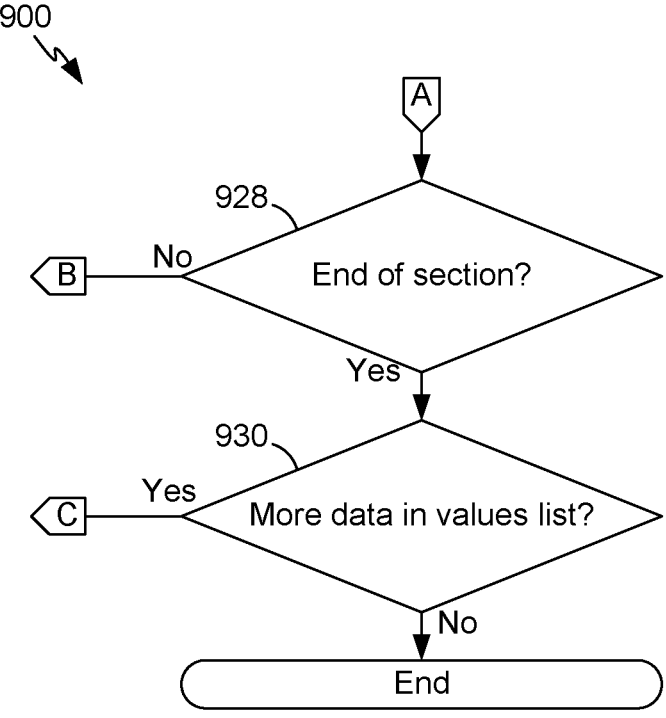
FIG. 9B is a continuation of the flowchart of FIG. 9A.

In FIGS. 9A-9B, a method 900 for decompressing compressed configuration data is shown in flowchart form. The method 900 may be performed in a computing device having configurable circuitry, and the resulting decompressed configuration data may be used to configure the configurable circuitry. For example, the method 900 may be performed in the above-described computing device 102 (FIG. 1). The method 900 may be performed, for example, during start-up (e.g., booting) of the computing device 102, or at other times.

As indicated by block 902 (FIG. 9A), the method 900 may begin with loading or reading an input file 904. The compressed file 702 described above with regard to FIG. 7 may be an example of the structure or organization of the input file 904. The input file 904 may contain, or may be separated into, a constants list 906, a sections list 908, and a values list 910, which may similarly be in the form of files. In the following description, the above-described (FIG. 7) constants table 714, section lookup table 718, and block data 728 are used as examples of the structure or organization of the constants list 906, sections list 908, and values list 910, respectively. Portions of the compressed file 702, such as the foregoing lists, may be read into a working memory (e.g., DRAM, SRAM, etc.) of the device having the configurable circuitry, and operated upon as described below with regard to the remainder of the method 900. The working memory may be used in this manner temporarily, i.e., during the method 900, and the files, lists, etc., may be deleted from the working memory or written over after the method 900 is completed and the configurable circuitry has been configured using the decompressed configuration data.

As indicated by block 912, a first data item may be read from the values list 910. In the portion of the values list 910 associated with each section, the first data item is the section index 730 (FIG. 7). In the block data 728 (FIG. 7), which represents an exemplary structure of the values list 910, each section index 730 is associated with a section of the block data 728. As described above with regard to FIG. 7, the section index 730 may be used as an index in the section lookup table 718. Accordingly, as indicated by block 914, the section index 730 may be used to look up an entry in the section lookup table 718 comprising a section_base 720 and associated section_len 722. In addition, the current key may be set to the section_base 720.

As each successive value is determined (in a manner described below), the corresponding key may be determined using the sections lists 908 (e.g., using the section lookup table 718 (FIG. 7)). Note that each of the one or more sections may correspond to a sequence of keys. The keys in each sequence begin at the section_base 720 of the section. Successive keys within a sequence increment in steps of delta, as described below.

As indicated by block 916, the next data item in the values list 910 may be read. In the exemplary block data 728 (FIG. 7), the next section_len bytes after the section index 730 are data items 734 in the section associated with that section index 730. In the illustrated example, each data item may be one byte in length, each value may be four bytes in length, and each key may be four bytes in length. Nevertheless, in other examples the data items, values, and keys may have other lengths.

As indicated by block 918, it may be determined whether the data item 734 (FIG. 7) that was read is an opcode. As described above, there may be, for example, four opcodes: 0xFC, 0xFD, 0xFE, and 0xFF.

If it is determined (block 918) that the data item 734 (FIG. 7) is not an opcode, then a value 716 in the constants table 714 (FIG. 7) may be looked up using the data item as the index, as indicated by block 920. For example: if the data item is zero, the constants table 714 may provide the first value 716A; if the data item is one, the constants table 714 may provide the second value 716B; etc.

If it is determined (block 918) that the data item 734 (FIG. 7) is an opcode, then an immediate value 736 may be read, where the immediate value 736 consists of a number of bytes indicated by the opcode, as indicated by block 922. In the example described herein, each opcode is one byte, and immediately following an opcode in the section data 732 there may be from one to four bytes that represent an immediate value 736. In the example described herein: the opcode 0xFC indicates to read the next one byte as the immediate value 736; the opcode 0xFD indicates to read the next two bytes as the immediate value 736; the opcode 0xFE indicates to read the next three bytes as the immediate value 736; and the opcode 0xFF indicates to read the next four bytes as the immediate value 736. When fewer than four bytes are read as the immediate value 736, the higher-order bytes may be padded with zeros.

As indicated by block 924, a key may be determined and output with the value determined in either block 920 or 922 as a key-value pair. Each key may be the section_base plus some number of increments (of delta) relating to the number of key-value pairs that have been output in the current section. Accordingly, the current key may then be incremented by delta, as indicated by block 926.

As indicated by block 928 (where the method 900 continues on FIG. 9B), it may be determined whether the end of the current section has been reached. That is, it may be determined whether the current key equals the sum of section_base and section_len. If it is determined that the end of the current section has not yet been reached, then the method 900 may return to block 916, where the next data item in the section may be read. If it is determined that the end of the current section has been reached, then it may be determined whether there are more data items in values list 910 (i.e., one or more sections remain to be processed in the block data 728), as indicated by block 930.

If it is determined that there are more data items in the values list 910, then the next data item in the values list 910 may be read, as indicated by block 932. Following this reading of the next data item, the method 900 may return to block 914, where the next section index may be read, in preparation for processing data values in the next section.

For purposes of clarity, the method 900 may represent the processing for only one data block 704 (FIG. 7), and the method 900 ends when it is determined (block 930) that there are no more data items in the values list 910. Nevertheless, it should be understood that there may be more than one data block 704 in some examples. The block table 706 indicates the end of each data block 704 and the beginning of the next data block 704 within the compressed file 702. After the last data item has been read from the last section of a data block 704, then the first value of the next data block 704 would be read if such a next data block 704 exists in the compressed file 702. Although not shown in FIGS. 9A-9B, the key-value pairs that are output as described above with regard to block 924 may be provided to the configurable circuitry of a computing device.

Although the operations (blocks) of the method 900 (FIGS. 9A-9B) are described above in an exemplary order intended to enhance understanding of the principles of the method 900, the operations may be performed in any order not inconsistent with such principles or effects. Further, alternative methods may include operations that are alternatives to the operations described above with regard to the method 900, and may include additional operations or fewer operations than described above.

In FIG. 10, a table 1000 illustrates an example of decompressing compressed configuration data comprising a sequence of data items: 0x0E, 0x00, 0xFF, 0x27, 0x70, 0xA4. 0x16, 0xFF, 0x50, 0x00, 0x50, 0x80, 0x95, 0x94, 0x7C, 0x6A, 0x99, 0x55, 0x00. Data items in this sequence that are processed or operated upon are shown in a first column 1002 of the table 1000. The operation indicated by the data item is shown in a second column 1004. A result is shown in a third column 1006. With the exception of the first data item associated with a section, the result is a key-value pair.

In the example illustrated in FIG. 10, the first data item in the sequence is 0x0E. As described above, the first data item associated with a section is a section index that may be used to look up the section_base 720 and section_len 722 using the section lookup table 718 (FIG. 7). The first data item 0x0E indicates to look up the section_base 720 and section_len 722 using a section index=14 (decimal). As shown in the third column 1006, the result of the lookup operation determines that the section_base is 0x0000C390 and the section_len is 10 (decimal). The section_len indicates that the current section decompresses into 10 key-value pairs.

In the example illustrated in FIG. 10, the next data item in the sequence is 0x00. As described above with regard to FIG. 5, 0x00 indicates to perform a lookup operation in the constants table 716 (FIG. 7) using 0x00 as an index, because 0x00 is in the range of 0x00 to 0xEF. As shown in the third column 1006, the result of the lookup operation is a determination that the value corresponding to the data item 0x00 is 0x00000000. The section_base is the first key associated with a section. As a result, the key-value pair [0x0000C390, 0x00000000] may be provided.

It should be understood that the values (i.e., numbers) used in this example are arbitrary and intended only as examples of 4-byte hexadecimal numbers. In other examples, values may have lengths other than four bytes. Likewise, the section_base of 0x0000C390 and the section- _len of 10 in this example are intended only as examples. A section may start at any base location and may have any length.

In the example illustrated in FIG. 10, the next data item in the sequence is 0xFF. As described above with regard to FIG. 5, 0xFF is an opcode that indicates to read the next four bytes from the sequence of data items. In the exemplary sequence, the four bytes following the current data item 0xFF are: 0x27, 0x70, 0xA4, and 0x16. As shown in the third column 1006, the result of reading these next four bytes is a determination that the value corresponding to the current data item 0xFF is 0x16A47027. The section_base is incremented by delta, which in the illustrated example is four, to provide the second key associated with the section. As a result, the key-value pair [0x0000C394, 0x16A47027] may be provided. Note that the value is assembled from the bytes in so-called little-endian order, meaning that the first byte that is read is placed in the least-significant position in the value.

In the example illustrated in FIG. 10, the next data item in the sequence (following the four bytes that were read) is also the opcode 0xFF. In the exemplary sequence, the four bytes following this data item are: 0x50, 0x00, 0x50, and 0x80. As shown in the third column 1006, the result of reading these next four bytes is a determination that the value corresponding to the current data item 0xFF is 0x80500050. The current key is incremented by delta to provide the third key associated with the section. As a result, the key-value pair [0x0000C398, 0x80500050] may be provided.

In the example illustrated in FIG. 10, the next seven data items in the sequence (following the four bytes that were read) are: 0x95, 0x94, 0x7C, 0x6A, 0x99, 0x55, 0x00. As described above with regard to FIG. 5, each of these data items indicates to perform a lookup operation in the constants table 716 (FIG. 7) using that data item as an index. The resulting key-value pairs are shown in the third column 1006.

Figure 11:
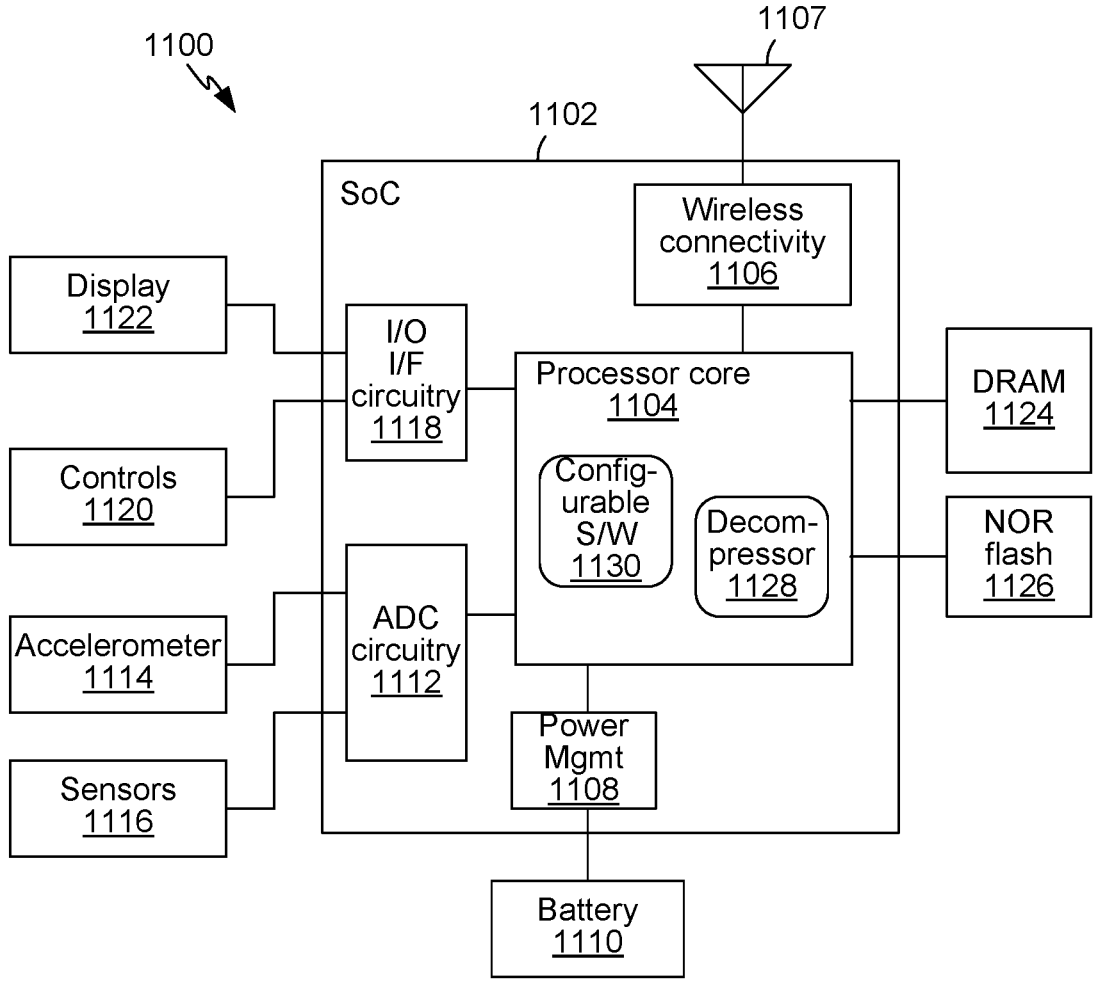
FIG. 11 is a block diagram of a computing device having configurable circuitry, in which systems, methods, and other examples of configuring such circuitry may be included, in accordance with exemplary embodiments.

As shown in FIG. 11, in an illustrative or exemplary embodiment, systems, methods and other examples for configuring configurable circuitry in a computing device may be provided in a wearable computing device 1100. The wearable computing device 1100 may be in the form of, for example, eyewear, a wristwatch, etc. The wearable computing device 1100 may be an example of the above-described computing device 102 (FIG. 1).

The wearable computing device 1100 may include a system-on-a-chip ("SoC") 1102. For purposes of clarity, some interconnections among SoC components or circuitry, such as data communication buses, signal lines, etc., are not shown in FIG. 11. The SoC 1102 may include a processor core 1104. Although in the illustrated example the wearable computing device 1100 may have only a single processor core 1104, in other examples such a computing device may have multiple processing cores. Various other components, such as the exemplary components or circuitry described below, may be coupled to the processor core 1104 via buses or other data interconnections.

The SoC 1102 may also include wireless connectivity circuitry 1106 and an associated antenna 1107, which may enable wireless Internet, Bluetooth®, or other wireless communication. The SoC 1102 may further include power management circuitry 1108, which may be coupled to a battery 1110. The SoC may include analog-to-digital conversion ("ADC") circuitry 1112. The wearable computing device 1100 may include an accelerometer 1114 and various sensors 1116 that may be coupled to the processor core 1104 via the ADC circuitry 1112. The SoC 1102 may include input/output ("I/O") interfaces 1118. The wearable computing device 1100 may include various user-operable controls 1120 (e.g., a button) and a display 1122. In an example in which the wearable computing device 1100 is in the form of eyewear, the display 1122 may be a heads-up display ("HUD") that may be used in augmented virtual reality applications. The controls 1120 and display 1122 may be coupled to the processor core 1104 via the I/O interfaces 1118.

The wearable computing device 1100 may also include a working memory, such as, for example, DRAM 1124, or SRAM (not shown). The wearable computing device 1100 may further include non-volatile memory, such as, for example, NOR flash memory 1126. The NOR flash memory 1126 may be used to store compressed configuration data as described above. Benefits of NOR flash may include faster read operation speed and higher data retention reliability than some other non-volatile memory technologies. As the NOR flash memory 1126 may have limited storage capacity, storing the configuration data in compressed form and then decompressing it in preparation for use of the wearable computing device 1100 may be advantageous. In some examples, the NOR flash memory 1126 may have less than one megabyte of storage capacity for storing the compressed configuration data. The NOR flash memory 1126 may have, for example, a storage capacity on the order of hundreds of kilobytes, which is small compared with non-volatile storage capacity of common portable computing devices such as tablet computers, smartphones, etc. The compressed configuration data may occupy, for example, less than 200 kilobytes in the NOR flash memory 1126.

A decompressor 1128 may be included. In the example illustrated in FIG. 11, the decompressor 1128 is implemented in software executed by the processor core 1104. That is, the execution of such software dynamically configures portions of the processor core (hardware) 1104 into an example of the "decompression circuitry" described above, such as the decompression circuitry 112 (FIG. 1). The processor core 1104 may retrieve such software from the NOR flash memory 1126 for execution. It should be understood that although for purposes of clarity the decompressor 1128 is conceptually depicted as a unitary element residing in the processor core 1104, the processor core 1104 may retrieve the software in portions, such as instructions, for execution in accordance with conventional computing principles. The decompressor 1128 may be thus configured to perform the above-described decompression method 600 (FIG. 6) or 900 (FIGS. 9A-9B). That is, the decompressor 1128 may read the compressed configuration data from the NOR flash memory 1126, decompress the data, and provide the resulting decompressed configuration data to target components having configurable circuitry.

Note that in the above-described example both the compressed configuration data as well as the software that the processor core 1104 executes to perform the decompression may be retrieved from the same NOR flash memory 1126. Nevertheless, in other examples the compressed configuration data may be retrieved from a first memory, and the software that is executed to perform the decompression may be retrieved from a second memory. Also note that although in the illustrated example the decompressor 1128 is implemented as a software component executed by the processor core 1104, in other examples (not shown) such a decompressor could be a separate hardware component, such as an SoC hardware component coupled to the processor core. All such examples may be examples of the "decompression circuitry" described above, such as the decompression circuitry 112 (FIG. 1).

Examples of components that may have configurable circuitry may include the wireless connectivity circuitry 1106, the power management circuitry 1108, and the ADC circuitry 1112 (which may encompass calibration circuitry for the accelerometer 1114, sensors 1116, etc., in addition to providing the analog-to-digital conversion function). In addition, or alternatively, there may be one of more configurable software components 1130. In the illustrated example, a configurable software component 1130 may be a portion of, or otherwise associated with, software executable by the processor core 1104.

For example, the configurable aspect of the software component 1130 may comprise a processor-executable instruction. That is, in a decompressed key-value pair the key may represent an address or memory location, and the value may represent an executable instruction, i.e., an executable portion of the configurable software component 1130. Configuring the configurable software component 1130 in such an example may comprise storing the executable instruction in the address or memory location. Alternatively, the configurable aspect of the software component 1130 may comprise data associated with or used by executable software. In a decompressed key-value pair, the key may represent an address or memory location, and the value may represent a configuration setting (i.e., a non-executable or "data" portion of the configurable software component 1130) that is accessed by the processor core 1104 when the processor core 1104 executes the associated software. Configuring the configurable software component 1130 in such an example may comprise storing the configuration setting in the address or memory location. Regardless of whether the value represents an executable instruction of the configurable software component 1130 or a non-executable data portion of the configurable software component 1130, the processor core 1104 is an example of the "configurable circuitry" described above, such as the configurable circuitry 110A or 110B (FIG. 1).

It should be understood that although for purposes of clarity the configurable software component 1130 is conceptually depicted as a unitary element residing in the processor core 1104, the above-referenced address or memory location may be physically present in the NOR flash 1126 or the DRAM 1124. In some examples, the above-referenced address or memory location may be in the form of a virtual address in a virtual address space, and an operating system (not shown) may convert between virtual addresses in the virtual address space and physical addresses in the NOR flash 1126, DRAM 1124, etc. Note that configurable circuitry of the wireless connectivity circuitry 1106, the power management circuitry 1108, the ADC circuitry 1112, etc., may be included in such a virtual address space.

Although in the illustrated example a single processor core 1104 is coupled to a single NOR flash memory 1126, in examples (not shown) having multiple processors, each processor may be coupled to an associated memory (e.g., one of multiple NOR flash memories) in which is stored compressed configuration data for decompression and use by that processor. Nevertheless, in still other examples (not shown) a first processor may decompress configuration data and provide the resulting decompressed configuration data for use by a second processor. Although not shown for purposes of clarity, each of the one or more processors may have a cache memory from which the processor may access instructions and data.

Although not shown for purposes of clarity, a loader component (which may be hardware or software) may participate in loading the value into target configurable circuitry indicated by the key. As described above, the target may be a memory address, into which a value representing an executable instruction or a configuration setting may be loaded, or the target may be a register, flip-flop, programmable circuit, or other hardware control element, into which a value or portion thereof may be loaded. The loader may control such loading of a value in a manner based on the key.

In still other examples (not shown), configurable software components may be distributed among multiple processors or cores. For example, with reference to FIG. 1, the configurable circuitry 110A may be a first processor or portion thereof, and the configurable circuitry 110B may be a second processor or portion thereof. Also, although in the example shown in FIG. 1 the decompression circuitry 112 is a separate element from the configurable circuitry 110A, 110B, etc., it should be apparent from the description above with regard to FIG. 11 that in some examples the same processor or core may implement such decompression circuitry by executing decompression software and may implement such configurable circuitry by having a configurable software component.

The decompressing of the compressed configuration data and configuring of components may be performed when the wearable computing device 1100 is powered up or booted, etc., in preparation for mission-mode operation. In mission mode, a user may wear and otherwise experience operation of the wearable computing device 1100. Nevertheless, the decompressing and configuring may be performed at other times, such as at times during mission-mode operation (e.g., during periods of low activity).

Configuring components of the wearable computing device 1100 may occur in a streaming or pipelined manner. For example, the compressed configuration data may be read from the NOR flash memory 1126 in sequential portions, and while a portion that has already been read and decompressed is being used to configure components, the next portion may be read from the NOR flash memory 1126. The sequential portions may be as small as individual key-value pairs. Each key-value pair in a stream of key-value pairs may be used to configure a component as soon as that key-value pair is provided from the decompressor 1128 to the configurable component.

It should be understood that the wearable computing device 1100 is only an example of a computing device in which systems, methods and other examples of decompressing configuration data and configuring circuitry using the decompressed configuration data may be provided. As described above with regard to FIG. 1, other examples include other types of wearables such as wristwatch-style devices. Still other examples include other IoT devices such as automotive devices, industrial and agricultural sensors and controllers, electric or water utility meters, and small household devices such as smart thermostats, smart garage door openers, etc.

Software/firmware may be stored in any of the above-described memories, such as the NOR flash 1126, the DRAM 1124, etc., or may be stored in a local memory directly accessible by the processor on which the software/firmware executes. Execution of such software/firmware may control aspects of any of the above-described methods or configure aspects of any of the above-described systems or circuitry. Any such memory or other non-transitory storage medium having software/firmware stored therein in computer-readable form for execution by processor hardware may be an example of a "computer-readable medium," as the term is understood in the patent lexicon.

Implementation examples are described in the following numbered clauses.

1. A method for configuring circuitry in a computing device, comprising:
    reading a sequence of data items stored in a non-volatile memory of the computing device;
    providing a value corresponding to a data item using a table of most frequently occurring values;
    providing a next key corresponding to the value; and
    configuring the circuitry using the next key and the corresponding value.

2. The method of clause 1, further comprising:
    determining whether the data item is an opcode;
    wherein providing the value comprises providing at least one next data item from the sequence of data items when the data item is an opcode.

3. The method of clause 2, wherein providing at least one next data item when the data item is an opcode comprises reading a number of bytes indicated by the opcode.

4. The method of any of clauses 1-3, wherein providing the next key comprises using a key table to determine the next key in one of a plurality of sequences of keys.

5. The method of any of clauses 1-4, wherein the computing device is an Internet-of-Things ("IoT") device.

6. The method of any of clauses 1-5, wherein the non-volatile memory is NOR flash memory.

7. The method of any of clauses 1-6, wherein each data item is a single byte, and the table of most frequently occurring values contains no more than 256 most frequently occurring values.

8. The method of any of clauses 1-7, wherein the non-volatile memory is configured to store the sequence of data items in less than one megabyte of storage.

9. A system for configuring circuitry in a computing device, comprising:
    a non-volatile memory; and
    decompressor circuitry configured to:
    read a sequence of data items stored in the non-volatile memory;
    provide a value corresponding to a data item using a table of most frequently occurring values;
    provide a next key corresponding to the value; and
    provide the next key and the corresponding value to configurable circuitry of the computing device.

10. The system of clause 9, wherein the decompressor circuitry is further configured to determine whether the data item is an opcode, wherein the decompressor circuitry is configured to provide at least one next data item from the sequence of data items when the data item is an opcode.

11. The system of clause 10, wherein the decompressor circuitry is configured to read a number of bytes indicated by the opcode.

12. The system of any of clauses 9-11, wherein the decompressor circuitry is configured to use a key table to determine the next key in one of a plurality of sequences of keys.

13. The system of any of clauses 9-12, wherein the computing device is an Internet-of-Things ("IoT") device.

14. The system of any of clauses 9-13, wherein the non-volatile memory is NOR flash memory.

15. The system of any of clauses 9-14, wherein each data item is a single byte, and the table of most frequently occurring values contains no more than 256 most frequently occurring values.

16. The system of any of clauses 9-15, wherein the non-volatile memory is configured to store the sequence of data items in less than one megabyte of storage.

17. A system for configuring circuitry in a computing device, comprising:
    means for reading a sequence of data items stored in a non-volatile memory of the computing device;
    means for providing a value corresponding to a data item using a table of most frequently occurring values;
    means for providing a next key corresponding to the value; and
    means for configuring the circuitry using the next key and the corresponding value.

18. The system of clause 17, further comprising:
    means for determining whether the data item is an opcode;
    wherein the means for providing the value comprises means for providing at least one next data item from the sequence of data items when the data item is an opcode.

19. The system of clause 18, wherein the means for providing at least one next data item when the data item is an opcode comprises means for reading a number of bytes indicated by the opcode.

20. The system of any of clauses 17-19, wherein the means for providing the next key comprises means for using a key table to determine the next key in one of a plurality of sequences of keys.

21. The system of any of clauses 17-20, wherein the computing device is an Internet-of-Things ("IoT") device.

22. The system of any of clauses 17-21, wherein each data item is a single byte, and the table of most frequently occurring values contains no more than 256 most frequently occurring values.

23. A system-on-a-chip ("SoC"), comprising:
    at least one processor core;
    at least one configurable circuitry element; and
    decompressor circuitry configured to:
    read a sequence of data items stored in the non-volatile memory;
    provide a value corresponding to a data item using a table of most frequently occurring values;
    provide a next key corresponding to the value; and
    provide the next key and the corresponding value to configurable circuitry of the computing device.

24. The SoC of clause 23, wherein the decompressor circuitry is further configured to determine whether the data item is an opcode, wherein the decompressor circuitry is configured to provide at least one next data item from the sequence of data items when the data item is an opcode.

25. The SoC of clause 24, wherein the decompressor circuitry is configured to read a number of bytes indicated by the opcode.

26. The SoC of any of clauses 23-25, wherein the decompressor circuitry is configured to use a key table to determine the next key in one of a plurality of sequences of keys.

27. The SoC of any of clauses 23-26, wherein the SoC further includes wireless connectivity circuitry, and the SoC is included in an Internet-of-Things ("IoT") device.

28. The SoC of any of clauses 23-27, wherein the non-volatile memory is NOR flash memory.

29. The SoC of any of clauses 23-28, wherein each data item is a single byte, and the table of most frequently occurring values contains no more than 256 most frequently occurring values.

30. The SoC of any of clauses 23-29, wherein the non-volatile memory is configured to store the sequence of data items in less than one megabyte of storage.

Alternative embodiments will become apparent to one of ordinary skill in the art to which the invention pertains. Therefore, although selected aspects have been illustrated and described in detail, it will be understood that various substitutions and alterations may be made therein.

What is claimed is:

1. A method for configuring circuitry in an Internet of Things ("IoT") computing device, comprising:
    reading a sequence of data items stored in a non-volatile memory of the IoT computing device, the non-volatile memory comprising NOR flash memory, each sequence of data items provides either an index to a table of most frequently occurring values or an opcode, each opcode designates a number of bytes to be read from the non-volatile memory of the IoT computing device once an opcode is determined from the sequence of data items;
    determining whether the sequence of data items is an opcode;
    reading a number of bytes from the non-volatile memory of the computing device when it is determined the sequence of data items in an opcode;
    determining whether the sequence of data items is an index;
    providing a value from the table of most frequently occurring values corresponding to the index when it is determined the sequence of data items is an index;
    determining a key-value pair associated with either the value from the table when the sequence of data items is an index or with the read number of bytes when the sequence of data items is an opcode; and
    configuring the circuitry using the key-value pair, where each key of the key-value pair identifies the circuitry to be configured and each value of the key-value pair is used to configure the circuitry.

2. The method of claim 1, wherein each step of the method is performed by processor of the IoT computing device.

3. The method of claim 2, wherein the processor is part of a system-on-chip (SoC) within the IoT computing device.

4. The method of claim 1, wherein each data item is a single byte, and the table of most frequently occurring values contains no more than 256 most frequently occurring values.

5. The method of claim 1, wherein the non-volatile memory is configured to store the sequence of data items in less than one megabyte of storage.

6. A system for configuring circuitry in an Internet of Things ("IoT") computing device, comprising:
    a non-volatile memory comprising NOR flash memory; and
    decompressor circuitry configured to:
    read a sequence of data items stored in the non-volatile memory of the IoT computing device; each sequence of data items provides either an index to a table of most frequently occurring values or an opcode, each opcode designates a number of bytes to be read from the non-volatile memory of the IoT computing device once an opcode is determined from the sequence of data items;
    determine whether the sequence of data items is an opcode;
    read a number of bytes from the non-volatile memory of the IoT computing device when the decompressor circuitry determines the sequence of items in an opcode;
    determine whether the sequence of data items is an index;

provide a value from the table of most frequently occurring values corresponding to the index when decompressor circuitry determines the sequence of data items is an index;

determine a key-value pair associated with either the value from the table when the sequence of data items is an index or with the read number of bytes when the sequence of items is an opcode; and configuring configurable circuitry of the IoT computing device using the key-value pair, where each key of the key-value pair identifies the circuitry to be configured and each value of the key-value pair is used to configure the configurable circuitry of the IoT computing device.

7. The system of claim 6, wherein the decompressor circuitry is part of a processor.

8. The system of claim 6, wherein the processor is part of a system-on-chip (SoC) of the IoT computing device.

9. The system of claim 6, wherein each data item is a single byte, and the table of most frequently occurring values contains no more than 256 most frequently occurring values.

10. The system of claim 6, wherein the non-volatile memory is configured to store the sequence of data items in less than one megabyte of storage.

11. A system-on-a-chip ("SoC") in an Internet of Things ("IoT") computing device, comprising:

at least one processor core;

at least one configurable circuitry element; and decompressor circuitry configured to:

read a sequence of data items stored in a non-volatile memory of the IoT computing device, the non-volatile memory comprising NOR flash memory; each sequence of data items provides either an index to a table of most frequently occurring values or an opcode, each opcode designates a number of bytes to be read from the non-volatile memory of the computing device once an opcode is determined from the sequence of data items;

determine whether the sequence of data items is an opcode;

read a number of bytes from the non-volatile memory of the IoT computing device when the decompressor circuitry determines the sequence of items in an opcode;

determine whether the sequence of data items is an index;

provide a value from the table of most frequently occurring values corresponding to the index when decompressor circuitry determines the sequence of data items is an index;

determine a key-value pair associated with either the value from the table when the sequence of data items is an index or with the read number of bytes when the sequence of items is an opcode; and configuring the at least one configurable circuitry element of the IoT computing device using the key-value pair, where each key of the key-value pair identifies the circuitry element to be configured and each value of the key-value pair is used to configure the circuitry element of the IoT computing device.

12. The SoC of claim 11, wherein the SoC further includes wireless connectivity circuitry.

13. The SoC of claim 11, wherein the SoC further includes at least one of: power management circuitry, analog-to-digital conversion ("ADC") circuitry, and Input/Output interface circuitry.

14. The SoC of claim 11, wherein each data item is a single byte, and the table of most frequently occurring values contains no more than 256 most frequently occurring values.

15. The SoC of claim 11, wherein the non-volatile memory is configured to store the sequence of data items in less than one megabyte of storage.

* * * * *